(12) United States Patent
Izu et al.

(10) Patent No.: US 9,510,216 B2
(45) Date of Patent: Nov. 29, 2016

(54) NODE DEVICE AND COMMUNICATION CONTROL METHOD

(71) Applicant: FUJITSU LIMITED, Kawasaki-shi, Kanagawa (JP)

(72) Inventors: Tetsuya Izu, London (GB); Yumi Sakemi, Kawasaki (JP); Kazuyoshi Furukawa, Kawasaki (JP); Hisashi Kojima, Yokosuka (JP); Masahiko Takenaka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 100 days.

(21) Appl. No.: 14/275,119

(22) Filed: May 12, 2014

(65) Prior Publication Data
US 2014/0247786 A1 Sep. 4, 2014

Related U.S. Application Data

(63) Continuation of application No. PCT/JP2011/006447, filed on Nov. 18, 2011.

(51) Int. Cl.
*H04W 24/04* (2009.01)
*H04L 12/26* (2006.01)
(Continued)

(52) U.S. Cl.
CPC .............. *H04W 24/04* (2013.01); *H04L 9/14* (2013.01); *H04L 9/3242* (2013.01); *H04L 29/0653* (2013.01); *H04L 43/16* (2013.01);
(Continued)

(58) Field of Classification Search
None
See application file for complete search history.

(56) References Cited

U.S. PATENT DOCUMENTS

2005/0177723 A1* 8/2005 Huang ................. H04L 9/0822
713/168
2008/0244739 A1* 10/2008 Liu ..................... H04L 63/1458
726/22

(Continued)

FOREIGN PATENT DOCUMENTS

JP    2003-69581    3/2003
JP    2003-348072   12/2003

(Continued)

OTHER PUBLICATIONS

S. Zhu et al., "An Interleaved Hop-by-Hop Authentication Scheme for Filtering of Injected False Data in Sensor Networks", *Proceedings of the 2004 IEEE Symposium on Security and Privacy*, May 2004, pp. 259-271.

(Continued)

*Primary Examiner* — Huy D Vu
*Assistant Examiner* — Teisha D Hall
(74) *Attorney, Agent, or Firm* — Staas & Halsey LLP

(57) ABSTRACT

A node device includes: a processor configured to: receive a first packet that is transferred from a source to a destination via at least one node device including the node device, the first packet including a counter value regarding a number of transfers of the first packet, and first coding information according to a first key information and contents of the first packet, determine whether to conduct a verifying process on the first packet based on the counter value, verify the first coding information is same as a second coding information, the second coding information being generated according to the contents of the first packet and a second key information stored in the memory, change the counter value in the first packet to an initial value, and transmit the first packet including a changed counter value to the destination or any one of the plurality of node devices.

11 Claims, 15 Drawing Sheets

(51) Int. Cl.
 H04W 12/10 (2009.01)
 H04L 9/14 (2006.01)
 H04L 9/32 (2006.01)
 H04L 29/06 (2006.01)
 H04W 12/12 (2009.01)
 H04W 84/18 (2009.01)

(52) U.S. Cl.
 CPC ......... H04W 12/10 (2013.01); *H04L 63/1466* (2013.01); *H04L 2209/80* (2013.01); *H04W 12/12* (2013.01); *H04W 84/18* (2013.01)

(56) References Cited

U.S. PATENT DOCUMENTS

| | | |
|---|---|---|
| 2011/0176681 A1 | 7/2011 | Yamada et al. |
| 2014/0044015 A1* | 2/2014 | Chen ................... H04L 41/145 370/255 |

FOREIGN PATENT DOCUMENTS

| | | |
|---|---|---|
| JP | 2007-88799 | 4/2007 |
| JP | 2009-81854 | 4/2009 |
| JP | 2010-98597 | 4/2010 |
| JP | 2010-528496 | 8/2010 |
| WO | WO 2011/121713 A1 | 10/2011 |

OTHER PUBLICATIONS

F. Ye et al., "Statistical En-Route Filtering of Injected False Data in Sensor Networks", *IEEE Journal on Selected Areas in Communications*, vol. 23, No. 4, Apr. 2005, pp. 839-850.
International Search Report mailed Jan. 17, 2012 in corresponding International Patent Application No. PCT/JP2011/006447.

* cited by examiner

NODE DEVICE AND COMMUNICATION CONTROL METHOD

CROSS-REFERENCE TO RELATED APPLICATION

This application is a continuation application of International Application PCT/JP2011/006447 filed on Nov. 18, 2011, the entire contents of which are incorporated herein by reference.

FIELD

The embodiments discussed herein relate a node device, and a communication control method.

BACKGROUND

An adhoc network is an autonomously configured type of network linked by wireless or wired communication. The adhoc network is configured by a plurality of nodes. Each node in the adhoc network transmits and receives packets using multihop communication. Multihop communication is a technology that allows nodes that are not present in the same communication zone to communicate with each other through another node that is present in the communication zone of the nodes.

Systems that use adhoc networks include a system that is able to conduct meter reading operations and the like through the adhoc network without workers traveling to the sites of the meters, by building nodes that enable wireless communication in household electrical power meters. This type of system is expected to enable secure communication (communication using encryption technology) from the standpoint of confidentiality and falsification prevention since private information such as the electrical power utilization amount of a household is managed in the adhoc network.

Conventional adhoc communication systems use a method that involves encrypting packets transmitted and received between the nodes in the adhoc network and adding a message authentication code (MAC) that is a type of encoding information to the packets. Such a method is disclosed in, for example, Japanese Laid-Open Patent Publication No. 2003-348072, Japanese Laid-Open Patent Publication No. 2010-98597, Japanese Laid-Open Patent Publication No. 2007-88799, and Japanese Laid-Open Patent Publication No. 2009-81854.

Regular packets sent and received in an adhoc network may be captured by anyone inside an adhoc network. As a result, attackers retransmit captured regular packets in an adhoc network in order to be able to easily execute an attack (retransmission attack) by congesting the network. Adhoc networks are desirable prepared against retransmission attacks by ensuring communication quality in the network since the abovementioned encryption of packets and the addition of message authentication codes in themselves are not able to reduce retransmission attacks.

Therefore, transmission time information of the packet is held in the header, and there is a technique that compares the time that the packet was received by the node with the transmission time in the header. If a large difference is found, this discrepancy is considered as the execution of a retransmission attack and the packet in question is discarded. When a retransmission attack is executed and malicious packets are concentrated around a specific node in this technology, a large amount of the processing capability of the node is taken up by the processing to discard the packets. As a result, a processing delay occurs in the particular node and there is a problem that a processing delay for the entire adhoc network may occur. International Publication Pamphlet No. WO 2011/121713 discloses a technique to address this problem by dispersing the load of the node throughout the entire adhoc network by selecting at random header verifications and message authentication code verifications when a node transmits received packets to another node.

SUMMARY

According to an aspect of the invention, a node device includes: a memory; and a processor coupled to the memory configured to: receive a first packet that is transferred from a source to a destination via at least one node device including the node device, the first packet including a counter value regarding a number of transfers of the first packet, and first coding information according to a first key information and contents of the first packet, determine whether to conduct a verifying process on the first packet based on the counter value, verify, when it is determined that the verifying process is to be conducted, the first coding information is same as a second coding information, the second coding information being generated according to the contents of the first packet and a second key information stored in the memory, change the counter value in the first packet to an initial value when the first coding information according to the first key information is same as the second coding information according to the second key information, and transmit the first packet including a changed counter value to the destination or any one of the plurality of node devices.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The transmission efficiency of the adhoc network with the abovementioned prior art may be reduced due to the presence of unverified malicious packets even when a plurality of hops are conducted. Alternatively, a problem of processing wasteful verifications occurs when a retransmission attack is conducted and normal packets that are verified at each hop are present.

From one aspect, since the problem due to the abovementioned prior art is addressed, an object of the embodiments discussed herein is to efficiently disperse the detection processing of malicious packets among the nodes in the adhoc network.

A detailed explanation of an embodiment of a communication method, a node, and a network system will be explained with reference to the accompanying drawings.

(First Embodiment)

(Network System)

Figure 1:
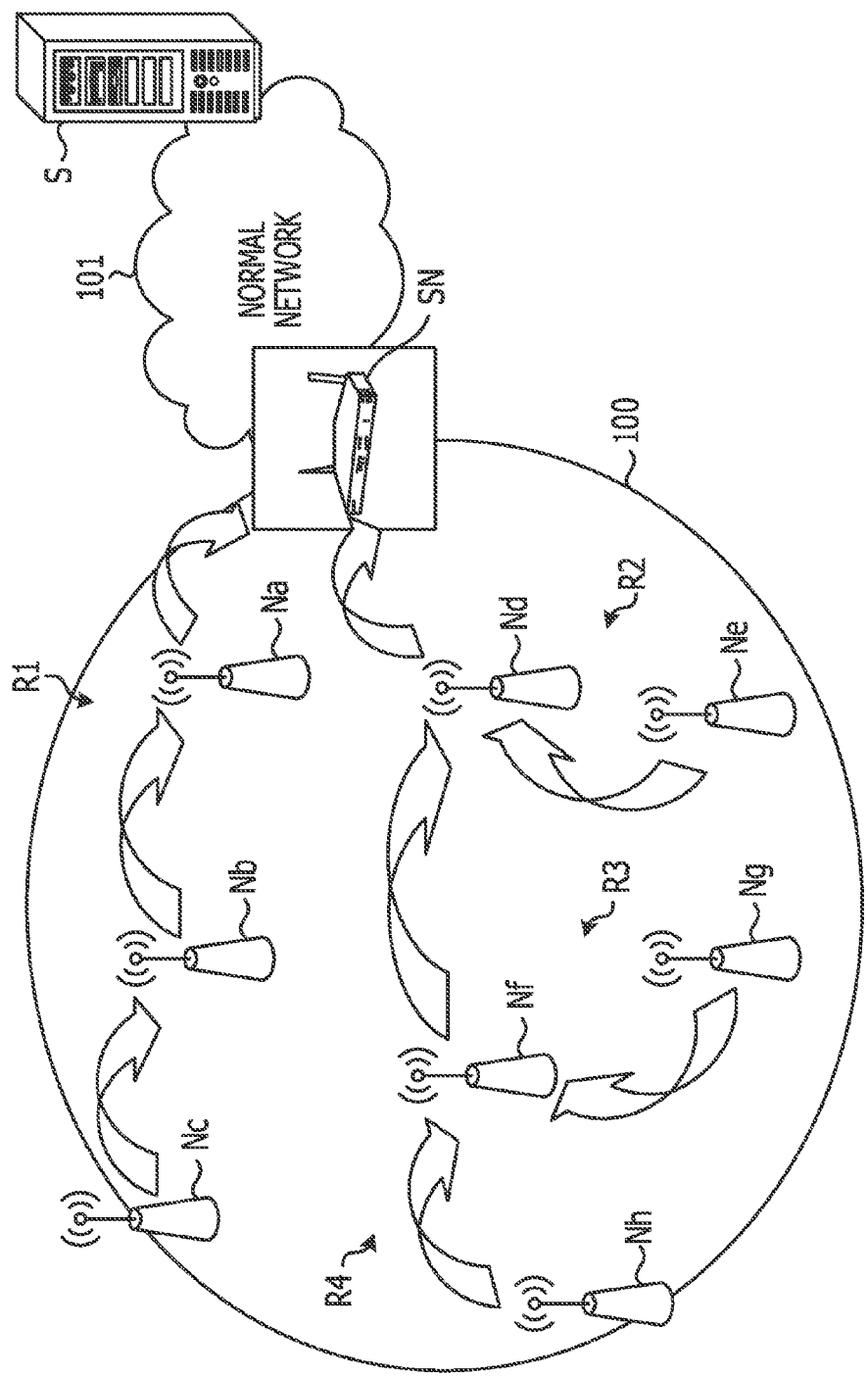
FIG. 1 illustrates a first embodiment of a network.

FIG. 1 illustrates a first embodiment of a network. A network system includes a management server S, a sink node SN, and nodes Na to Nh. The management server S and the sink node SN are connected via a normal network 101 such as the Internet, a LAN, or a WAN. The sink node SN and the nodes Na to Nh are connected via an adhoc network 100.

The sink node SN is a relay device for connecting the adhoc network 100 and the normal network 101. The sink node SN is able to transmit and receive both information in the format of a protocol of the adhoc network 100 and information in the format of a protocol of the normal network 101, and the sink node SN transfers communications by converting the protocols of the information between the adhoc network 100 and the normal network 101. For example, a packet transmitted from nodes in the adhoc network 100 to the management server S is protocol-converted by the sink node SN and then transferred as a packet to the normal network 101 to arrive at the management server S. Moreover, data transmitted from the management server S or the sink node SN to each of the nodes is protocol-converted by the sink node SN and transferred as packets from the sink node SN to the nodes in the adhoc network.

The sink node SN uses a routing table to learn whether or not to conduct communication between the nodes, and the sink node SN autonomously conducts routing based on the information in the routing table. The nodes are set as transfer sources and transfer destinations when conducting multihop communication based on the routing of the sink node SN.

A plurality of nodes are provided in the adhoc network 100. FIG. 1 illustrates the nodes Na to Nh as representative nodes.

The nodes are wireless communication devices that are able to conduct multihop communication with other nodes that are able to communicate in a specific communication zone. All the nodes Na to Nh are not necessarily in direct communication with the sink node SN in the adhoc network 100, but all the nodes Na to Nh are able to eventually communicate with the sink node SN by repeated multihops. As a result, a portion of the nodes may be able to directly communicate with the sink node SN in the adhoc network 100. In FIG. 1, the nodes that are able to directly communicate with the sink node SN are the nodes Na, and Nd.

The network system of the present embodiment is applicable to a system for collecting, for example, utilization amounts of electrical power or gas from households. With this type of system, nodes are installed in household electrical power meters or household gas meters for detecting the utilization amount of electrical power or gas in the household. The management server S is able to collect the utilization amounts of the electrical power or gas from each household since the nodes collect the detected utilization amounts of the electrical power or gas from each household and transmit the utilization amounts to the management server S.

Specifically, for example, nodes are built into each electrical power meter or gas meter in a household. The nodes transmit the household electrical power or gas utilization amounts detected by the nodes and transmit the utilization amounts to the management server S via the adhoc network 100. The household electrical power or gas utilization amounts may be measured by the nodes or may be obtained by the nodes from the electrical power meters or gas meters. The sink node SN transmits the household electrical power or gas utilization amounts received from the nodes via the adhoc network 100 to an electrical power company server or gas company server (e.g., the management server S) via the normal network 101. As a result, the electrical power or gas utilization amounts may be collected without workers traveling to the sites.

The network system of the present embodiment includes encrypting of packets through the use of encryption keys. Conversely, message authentication codes (MACs) are created and added to the packets using MAC keys. As a result, the adhoc network 100 ensures secure transmission (data confidentiality and falsification prevention and the like).

In the example in FIG. 1, while one sink node SN is provided in the adhoc network 100, a plurality of sink nodes SN may be provided in one adhoc network 100.

While one adhoc network 100 is illustrated in FIG. 1, a plurality of adhoc networks may be included. When a plurality of adhoc networks are present, each of the plurality of adhoc networks include at least one sink node, and the management server S is connected to the applicable sink nodes via the normal network 101. According to this configuration, the management server S and all of the nodes are able to transmit and receive data.

In addition to collecting the electrical power or gas utilization amounts, the nodes in the network system may each have a sensor function for detecting temperature, humidity, and light quantities which may be used, for example, when researching environments and the like.

In FIG. 1, four routes R1 to R4 are set by the nodes Na to Nh that configure the adhoc network 100. Specifically, the route R1 is a route that follows the node Nc to the node Nb to the node Na to the sink node SN (communication in the reverse direction is also possible). The route R2 is a route that follows the node Ne to the node Nd to the sink node SN (communication in the reverse direction is also possible). The route R3 is a route that follows the node Ng to the node Nf to the node Nd to the sink node SN (communication in the reverse direction is also possible). The route R4 is a route that follows the node Nh to the node Nf to the node Nd to the sink node SN (communication in the reverse direction is also possible). The node Na and the node Nd are nodes that conduct direction communication with the sink node SN.

Nodes closer to the sink node SN are referred to as upstream nodes. The nodes Nb and Ne may also be upstream nodes depending on the size of the adhoc network 100.

The nodes Na to Nh transmit detected data to the sink node SN according to the routed routes R1 to R4. Therefore, upstream nodes closer to the sink node SN transfer the detection data of the downstream nodes further upstream. Specifically, upstream nodes have a higher frequency of transmitting packets from the transfer sources to the transfer destination and thus have a high transfer load.

(Detection and Discarding of Malicious Packets in Present Embodiment)

Figure 2:
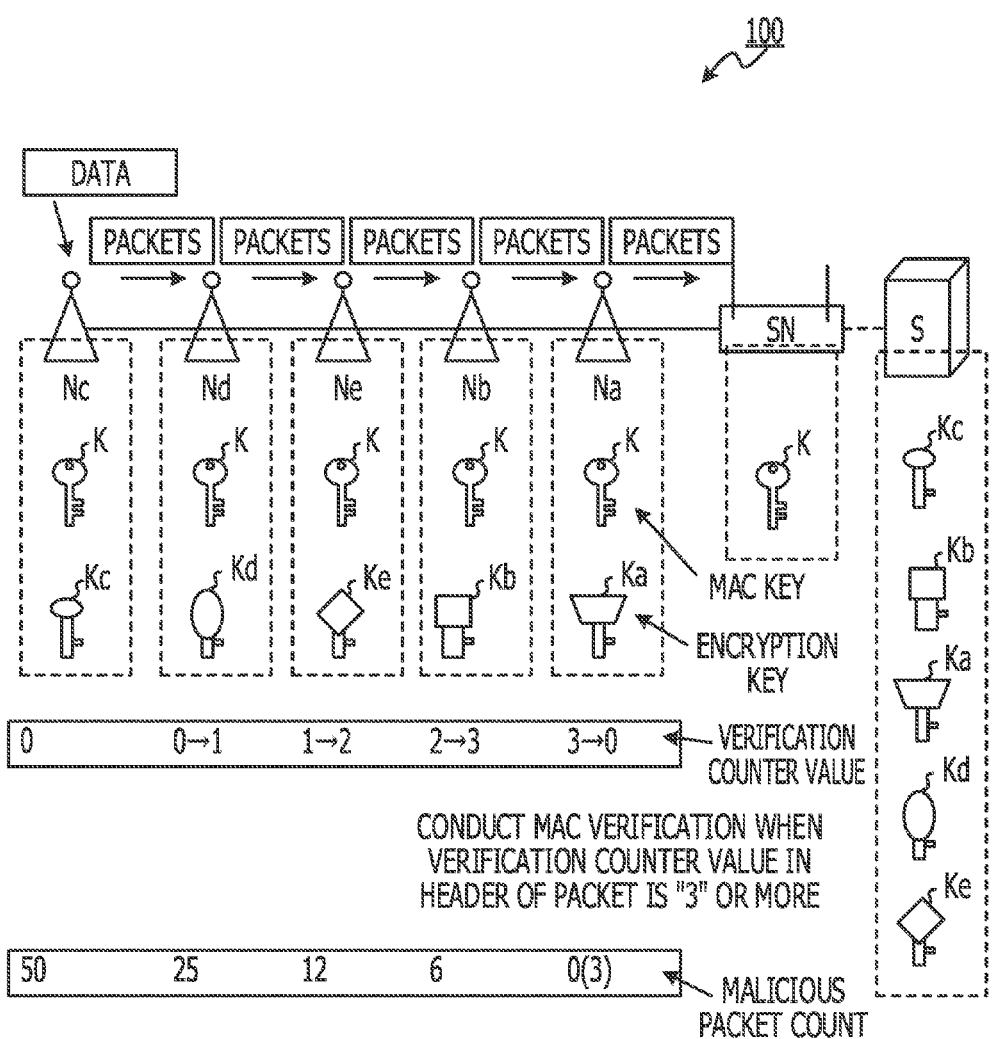
FIG. 2 illustrates the discarding of malicious packets in this embodiment.

FIG. 2 illustrates the discarding of malicious packets in the present embodiment.

There are various methods for detecting malicious packets. For example, a MAC verification when a node conducts the MAC verification on a packet from a node that does not have a MAC key. A packet for which a MAC verification has failed in this way is determined as a malicious packet. Moreover, an attack in which a large amount of regular packets are sent may occur. In such a case, the headers of the packets hold the transmission time information of the applicable packet. When the time that the node received the packet is compared with the transmission time held in the header, it is determined that a retransmission attack has been conducted if the difference between the two times is large.

In the present embodiment, a packet transferred by multihop communication in the adhoc network 100 may or may not have a MAC value authenticated (MAC authentication) with a MAC key K by a node on the route.

For example, the nodes in the present embodiment have a previously set probability of 50% for implementing MAC authentication (authentication implementation probability P). As a result, a node that receives a bundle of malicious packets conducts MAC authentications on half (50%) of the malicious packets from the bundle of malicious packets and transfers the remaining half of the malicious packets to the transfer destination node.

The node that receives the packets extracts a counter value stored in the headers of the packets and conducts MAC authentication if the counter value is equal to or greater than a prescribed value ("3" in the present embodiment). The "prescribed value" for deciding whether to conduct the MAC authentication is decided according to the balance between processing for transferring malicious packets and processing for conducting MAC verification. The "prescribed value" for deciding whether to conduct the MAC authentication, for example, is decided as appropriate in response to the size of the network, the number of hops between nodes in the adhoc network 100, the percentage of malicious packet existing in relation to all the packets, or the load conditions of the nodes. For example, if the loads of the nodes are constantly low, MAC verification may be conducted in all the nodes. If the percentage of malicious packets is low, the "prescribed value" for deciding whether to conduct MAC authentication may be increased.

By dispersing the processing for MAC authentications among the nodes, the load for processing MAC authentications may be decreased for the sink node SN or the nodes that receive packets directly. As a result, effective communication in the adhoc network 100 may be achieved.

The adhoc network 100 in FIG. 2 includes the nodes Na, Nb, Nc, Nd, Ne, and the sink node SN. Packets are transferred in the order of the node Nc→the node Nd→the node Ne→the node Nb→the node Na→the sink node SN based on adhoc routing by the sink node SN.

The nodes Na to Ne share a MAC key for authenticating messages, that is, a MAC key used when distinguishing between regular and malicious packets. The nodes Na to Ne attach a MAC (message authentication code, referred to below as "MAC value") to the packets and transfer the packets.

For example, when data is detected by the node Nc, the node Nc encrypts a message including the detection data. In this example, it is assumed that the node Nc receives 100 malicious packets from a malicious node. Since the authentication implementation probability P is 50% in each node in FIG. 2, the node Nc conducts MAC authentication on 50 malicious packets. The node Nc transfers the remaining 50 malicious packets to the node Nd which is the transfer destination. The MAC value obtained from each of the 50 malicious packets when conducting the MAC authentication is different from the MAC value generated by the authentication key stored in the node Nc. Therefore, the 50 malicious packets subject to the MAC authentication are discarded by the node Nc.

When the nodes are transmission sources, messages are encrypted by encryption keys that the nodes use to generate encrypted messages. In FIG. 2, the node Nc has an encryption key Kc, the node Nd has an encryption key Kd, the node Ne has an encryption key Ke, the node Nb has an encryption key Kb, the node Na has an encryption key Ka, and the management server S has the encryption keys Ke, Kd, Kc, Kb, and Ka of the nodes. A system using different encryption keys may be used, or a system using the same key throughout may be used. In the present embodiment, the transmission sources and the transmission destinations of packets have encryption keys.

A message that is encrypted is called an encrypted message. Next, the node Nc generates a header for each packet. The node Nc sets the counter value in the header to an initial value at this time. The node Nc generates the MAC value from the encrypted message and the header and updates the header of the packet that includes the encrypted message and the MAC value and transfers the packet to the node Nd.

The node Nd transfers the packet transferred from the node Nc to the node Ne. The node Nd conducts MAC authentication on 25 of the malicious packet among the 50 malicious packets from the node Nc based on the authentication implementation probability P of 50%, and transfers the remaining 25 malicious packets to the node Ne that is the transfer destination. The MAC value obtained from each of the 25 malicious packets when conducting the MAC authentication is different from the MAC value generated by the authentication key stored in the node Nd. Therefore, the 25 malicious packets subject to the MAC authentication are discarded by the node Nd.

The node Nd extracts the counter value stored in the header of the packet and conducts MAC authentication if the counter value is equal to or greater than "3". In the example in FIG. 2, the counter value of the malicious packets received by the node Nd is "0". Therefore, the node Nd transfers the remaining malicious packets without conducting the MAC authentication. The node Nd increments the counter value of "0" of the malicious packets by "1" when transferring the malicious packets.

The node Ne conducts MAC authentication on 13 of the 25 malicious packets from the node Nd based on the authentication implementation probability P of 50%, and transfers the remaining 12 malicious packets to the node Nb that is the transfer destination. The MAC value obtained from each of the 13 malicious packets when conducting the MAC authentication is different from the MAC value generated by the authentication key that the node Nd has. Therefore, the 13 malicious packets subject to the MAC authentication are discarded by the node Nd.

The node Ne extracts the counter value stored in the header of the packet and conducts MAC authentication if the counter value is equal to or greater than "3". In the example in FIG. 2, the counter value of the malicious packets received by the node Ne is "1". Therefore, the node Ne transfers the remaining malicious packets without conducting the MAC authentication. The node Ne increments the counter value of "1" of the malicious packets by "1" when transferring the malicious packets.

The node Nb conducts MAC authentication on six of the twelve malicious packets from the node Nb and transfers the remaining six malicious packets to the node Na that is the transfer destination. The MAC value obtained from each of the six malicious packets when conducting the MAC authentication is different from the MAC value generated by the authentication key that the node Nb has. Therefore, the six malicious packets subject to the MAC authentication are discarded by the node Nb.

The node Nb extracts the counter value stored in the header of the packet and conducts MAC authentication if the counter value is equal to or greater than "3". In the example in FIG. 2, the counter value of the malicious packets received by the node Ne is "2". Therefore, the node Nb transfers the remaining malicious packets without conducting the MAC authentication. The node Nb increments the counter value of "2" of the malicious packets by one so that the counter value becomes "3" when transferring the malicious packets.

The node Na conducts MAC authentication on three of the six malicious packets from the node Nb based on the authentication implementation probability P of 50%.

The node Na extracts the counter value stored in the header of the packet and conducts MAC authentication if the counter value is equal to or greater than "3". In the example in FIG. 2, the counter value of the malicious packets received by the node Na is "3". Therefore, the node Na conducts the MAC authentication on all of the remaining malicious packets. As a result, all the malicious packets detected by the node Nc are discarded without passing beyond the node Na.

Similarly, when data is detected by the node Nb, the node Nb generates an encrypted message based on the detected data. Next, the node Nb generates a header for each packet. The node Nb generates the MAC value from the encrypted message and the header and updates the header of the packet that includes the encrypted message and the MAC value and transfers the packets to the node Na. The node Na transfers the packets transferred from the node Nb to the sink node SN.

In the example in FIG. 2, the counter value of the packets for which the transmission source is the node Nc is set to "0" as the initial value. Multihop communication is then conducted and the nodes that conduct the transfer processing increment the counter value when the MAC verification is not conducted on the packets. In the example in FIG. 2, the nodes Nd, Ne, and Nb correspond to the nodes that do not conduct the MAC verification on the packets based on the counter value.

Conversely, the nodes that conduct the MAC verification on the packets initialize the counter value. In the example in FIG. 2, the node Na corresponds to the node that conducts the MAC verification on the packets.

According to the above configuration, since the nodes may conduct the MAC verification on the packets when conducting the MAC authentication based on the authentication implementation probability P and when the counter value is equal to or greater than a prescribed value, the amount of processing for MAC verification throughout the entire adhoc network 100 is decreased. Moreover, since the MAC verification is conducted on the packets for which the counter value is equal to or greater than a certain number, it is possible to remove the malicious packets quickly.

(Packet Configuration)

Figure 3:
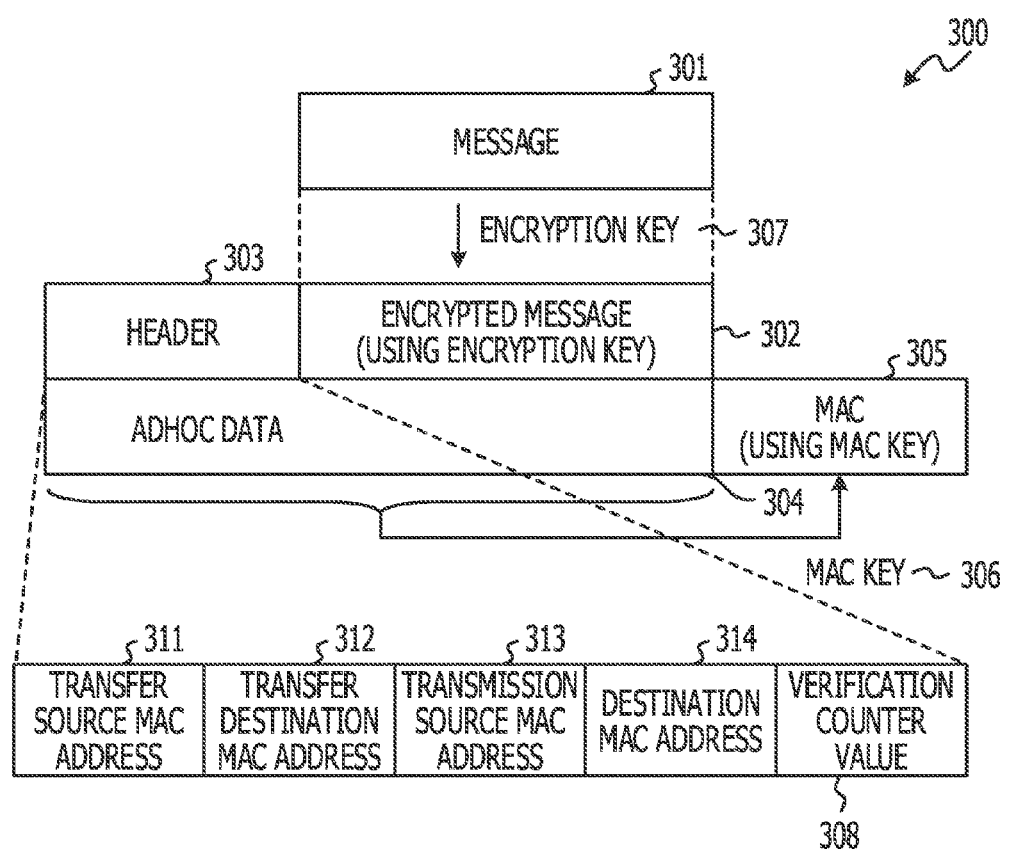
FIG. 3 illustrates an example of a configuration of a packet according to the embodiment.

FIG. 3 illustrates an example of a configuration of a packet according to the embodiment.

A packet 300 is configured by adhoc data 304 and a MAC 305. The adhoc data 304 includes a header 303 and an encrypted message 302.

The header 303 includes information about a transmission source address, a destination address, a transfer source address, and a transfer destination address for the encrypted message 302, and a counter value. A media access control (MAC) address of the transmission source node, a MAC address of the destination node, a MAC address of the transfer source node, and a MAC address of the transfer destination node, for example, are used for the addresses. The following explanation of the present embodiment describes the use of MAC addresses for the addresses.

The header 303 includes a transfer source MAC address 311, a transfer destination MAC address 312, a transmission source MAC address 313, a destination MAC address 314, and a counter value 308.

The transfer source MAC address 311 is the MAC address of the node that is the multihop communication source of the packet 300. The transfer destination MAC address 312 is the MAC address of the node that is the multihop communication destination of the packet 300. The transfer source MAC address 311 and the transfer destination MAC address 312 are rewritten to become transfer source and transfer destination MAC addresses from the point of view of the transfer destination node by the node that received the packet 300 when transferred by multihop communication. The transmission source MAC address 313 is the MAC address of the node that is the detection source of the message 301 in the packet 300. The transmission destination MAC address 314 is the MAC address of the node that is the destination of the message 301 in the packet 300. For example, when a node is the transmission source, the destination MAC address 314 becomes the MAC address of the sink node SN or the MAC address of the management server S.

If the transfer destination MAC address 312 and the destination MAC address 314 are the same, the packet has arrived at the node specified in the destination MAC address 314 and the multihop communication is completed.

The counter value 308 is information for determining whether to conduct MAC verification. The counter value 308 in the present embodiment corresponds to the number of nodes that the packet 300 has passed through without MAC verification subsequent to a previous MAC verification. The counter value is incremented by "1" when the packet 300 passes through a node but verification is not conducted. The counter value is initialized to "0" when a MAC verification is conducted.

The encrypted message 302 is an encrypted version of the message 301. The message 301 is, for example, data to be transmitted by the transmission source node to a server. The transmission source node generates the encrypted message 302 by using an encryption key 307 to encrypt the message 301 in order to ensure the confidentiality of the message 301. The encryption key 307 of the present embodiment is unique for each node.

The MAC 305 is value of a message authentication code (MAC). The MAC 305 is a message authenticator in which the adhoc data 304 is encrypted with a MAC key (MAC key 306) shared among all the nodes in the adhoc network 100. The transmission source node or the transfer source node generates the MAC 305 for the adhoc data 304 with the MAC key and generates the packet 300 in which the generated MAC 305 has been added to the adhoc data 304 in order to allow the transfer destination node to verify that the adhoc data 304 has not been falsified.

When any of the nodes receives the packet 300, the packet 300 is divided into the adhoc data 304 and the MAC 305 and MAC verification is conducted on the adhoc data 304. The packet 300 is discarded if the verification fails.

(Routing Table)

Figure 4A:
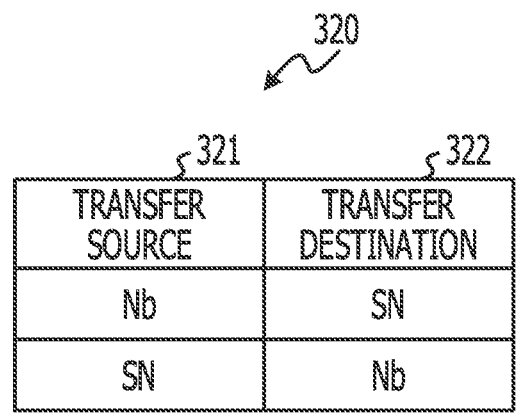
FIG. 4A and FIG. 4B illustrate examples of routing tables stored in each node.
Figure 4B:
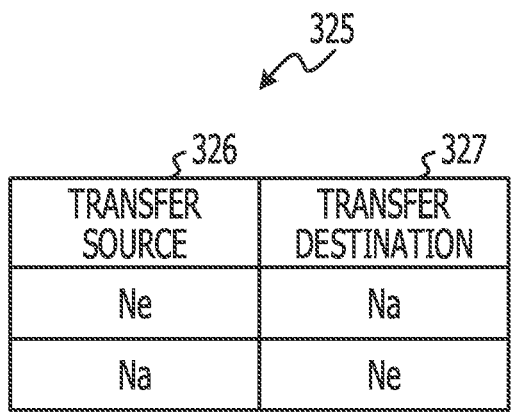

FIG. 4A and FIG. 4B illustrate examples of routing tables stored in each node. FIG. 4A illustrates a routing table 320 in the node Na. FIG. 4B illustrates a routing table 325 in the node Nb. For ease of explanation, node symbols are used in place of the MAC addresses in FIGS. 4A and 4B. For example, "Na" in the routing tables indicates the MAC address of the node Na.

The record in the first row of the routing tables is to be used when transferring in the upstream direction toward the sink node SN, and the record in the second row is to be used when transferring downstream toward a terminal. The record in the second row is applied, for example, when broadcasting from the sink node SN is conducted.

Specifically, the node Na refers to the routing table 320 when a packet is transferred from a node specified by the transfer source MAC address 321 in the routing table 320. The node Na then specifies the transfer destination MAC address 322 corresponding to the transfer source MAC address 321. The node Na then rewrites the transfer destination MAC address 312 in the header 303 of the received packet 300 to the MAC address specified by the transfer destination MAC address 322 in the routing table 320. The node Na rewrites the transfer source MAC address 311 in the header 303 of the received packet 300 to the MAC address of the node Na.

When a packet with the transfer source MAC address "Nb" and the transfer destination MAC address "Na" is transferred, the node Na rewrites the transfer source MAC address 311 from "Nb" to "Na" and rewrites the transfer destination MAC address 312 from "Na" to "SN" in the header 303 according to the routing table 320.

When a packet with the transfer source MAC address "SN" and the transfer destination MAC address "Nb" is transferred, the node Na rewrites the transfer source MAC address 311 from "SN" to "Na" and rewrites the transfer destination MAC address 312 from "Na" to "Nb" in the header 303 according to the routing table 320.

Similarly, the node Nb refers to the routing table 325 when a packet is transferred from a node specified by the transfer source MAC address 326 in the routing table 325. The node Nb then specifies the transfer destination MAC address 327 corresponding to the transfer source MAC address 326. The node Nb then rewrites the transfer destination MAC address 312 in the header 303 of the received packet 300 to the MAC address specified by the transfer destination MAC address 327 in the routing table 325. The node Nb rewrites the transfer source MAC address 311 in the header 303 of the received packet 300 to the MAC address of the node Nb.

When the packet 300 with the transfer source MAC address "Ne" and transfer destination MAC address "Nb" is transferred from the node Ne, the node Nb rewrites the transfer source MAC address 311 from "Ne" to "Nb" and rewrites the transfer destination MAC address 312 from "Nb" to "Na" in the header 303 according to the routing table 325.

When the packet 300 with the transfer source MAC address "Na" and transfer destination MAC address "Ne" is transferred from the node Na, the node Nb rewrites the transfer source MAC address 311 from "Na" to "Nb" and rewrites the transfer destination MAC address 312 from "Nb" to "Ne" in the header 303 according to the routing table 325.

(Explanation of Node Functions)

Figure 5:
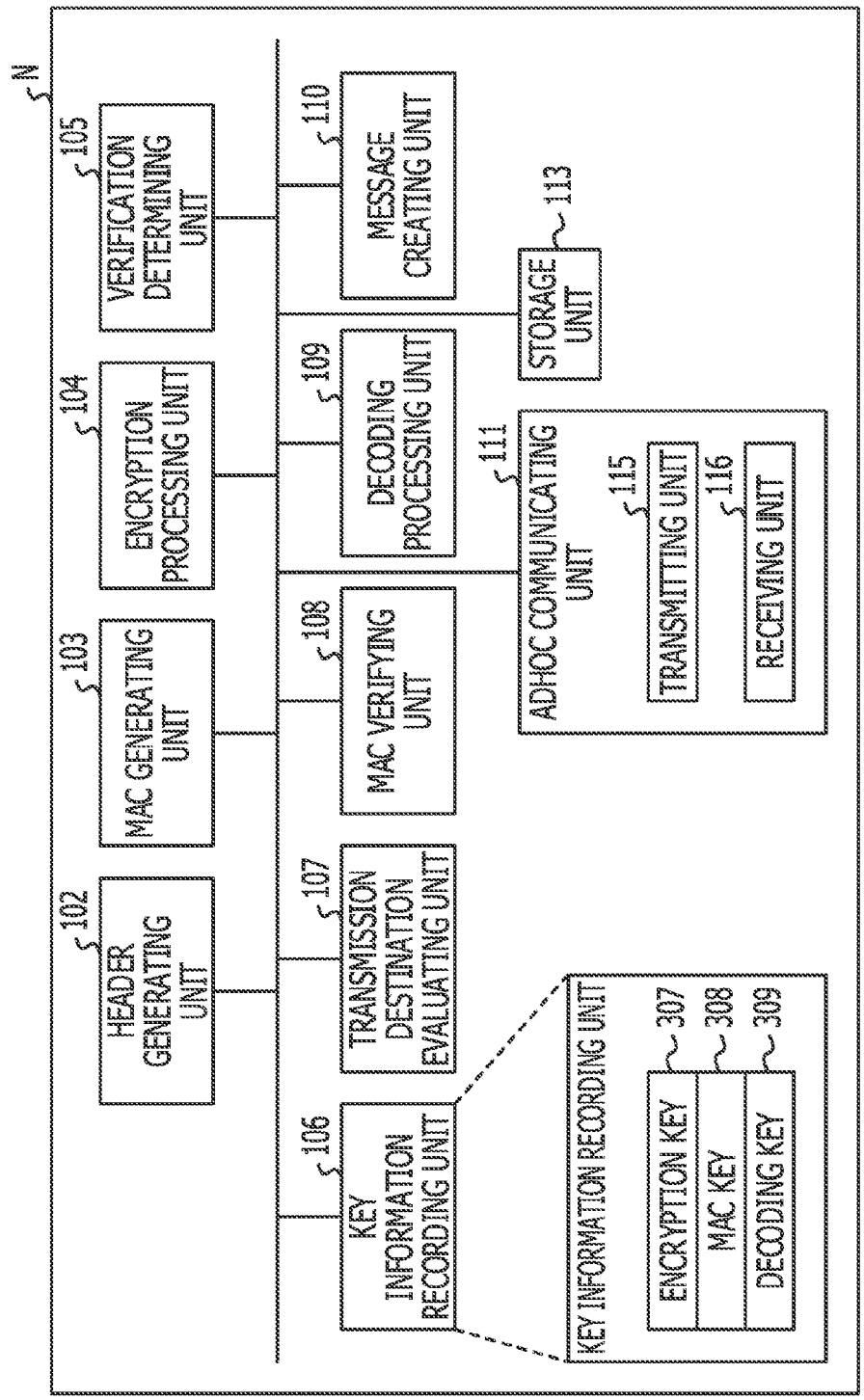
FIG. 5 is a functional block diagram of a node according to the embodiment.

FIG. 5 is a functional block diagram of a node according to the embodiment.

A node N includes an adhoc communicating unit 111, a header generating unit 102, a MAC generating unit 103, an encryption processing unit 104, a verification determining unit 105, a key information storage unit 106, a transmission destination evaluating unit 107, a MAC verifying unit 108, a storage unit 113, and a decoding processing unit 109.

The adhoc communicating unit 111 includes a transmitting unit 115 and a receiving unit 116. The transmitting unit 115 transmits the packet 300 to the transmission destination node via the adhoc network 100. The receiving unit 116 receives the packet 300 from the transmission source node via the adhoc network 100. In the present embodiment, while not limited in particular, transmitting by the adhoc communicating unit 111 is conducted by the transmitting unit 115, and receiving by the adhoc communicating unit 111 is conducted by the receiving unit 116.

The header generating unit 102 generates the header 303. The header generating unit 102 further generates the adhoc data 304 by adding the header 303 to the encrypted message 302.

The MAC generating unit 103 extracts the MAC key 306 from the key information storage unit 106 and generates the MAC 305 for the adhoc data 304. The MAC generating unit 103 adds the generated MAC 305 to the adhoc data 304 to generate the packet 300.

The encryption processing unit 104 generates the encrypted message 302 by using the encryption key 307 to encrypt the message 301.

The verification determining unit 105 judges whether to verify the packet 300 in accordance with the counter value in the header 303. The verification determining unit 105 further assesses whether to conduct MAC authentication based on the authentication implementation probability P.

The key information storage unit 106 stores the encryption key 307, the MAC key 306, and a decoding key 309.

The transmission destination evaluating unit 107 determines whether the host node is the final transmission destination of the received packet 300 based on the header 303.

The MAC verifying unit 108 reads the MAC key 306 and verifies the MAC 305 for the adhoc data 304.

The storage unit 113 stores the routing table, a reference table, and a probability table.

The decoding processing unit 109 extracts the decoding key 309 from the key information storage unit 106 and decodes the encrypted message 302 to obtain the message 301. The decoding key 309 may be the same as the encryption key 307 depending in the system. Moreover, decoding keys may be stored in each transmission source node.

(Processing From Data Detection to Packet Generation to Packet Transmission)

The following is an explanation of processing when a certain node (a node N1 in this example) transmits the message 301.

Figure 6:
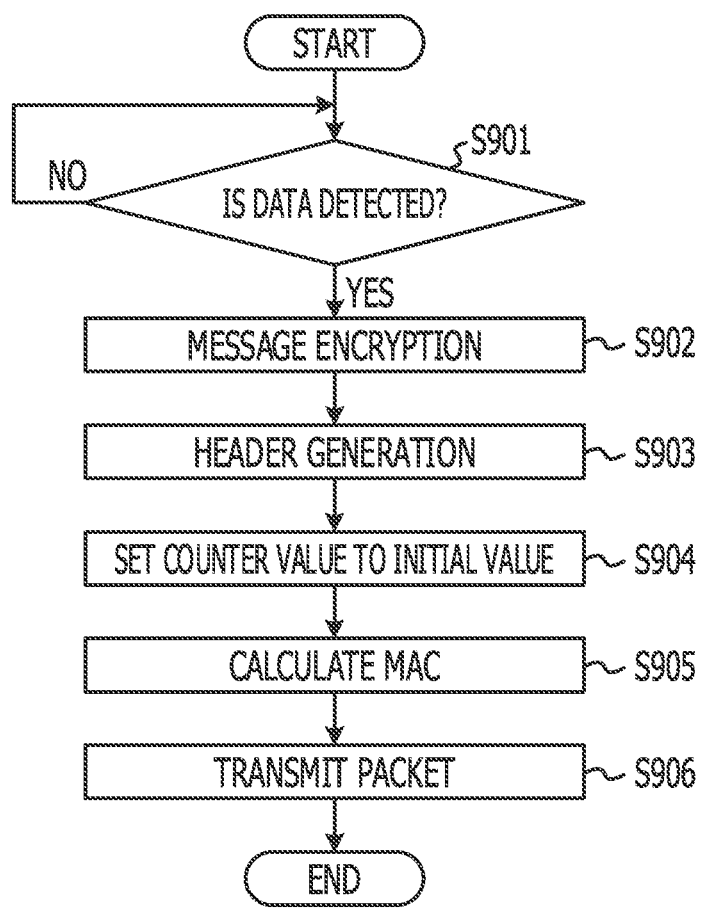
FIG. 6 is a flowchart depicting transmission processing procedures.

FIG. 6 is a flow chart illustrating operating procedures for transmitting detected data conducted by the nodes included in the adhoc network 100. The processing describes the generation by the node N1 of a packet for transmitting data detected by a sensor to the sink node SN.

First, the node N1 waits until data is detected by a sensor 706 (S901: No). When data is detected (S901: Yes), the node N1 transmits the message 301 for transmission that includes the data to the encryption processing unit 104.

The encryption processing unit 104 reads the encryption key 307 from the key information storage unit 106 upon receiving the message 301 to be transmitted, and encrypts the message 301 (S902) to generate the encrypted message 302. The encryption processing unit 104 transmits the generated encrypted message 302 to the header generating unit 102.

The header generating unit 102 generates the information for the header 303 (S903). The node N1 sets the transfer source MAC address 311 in the header 303 to the host node MAC address and sets the transfer destination MAC address 312 to the upstream MAC address (corresponding to the records in the first rows of the routing tables in FIGS. 4A and 4B) among the transfer destination MAC addresses prescribed in the routing table stored in the node N1. The node N1 sets the transmission source MAC address 313 to the host node MAC address and sets the destination MAC address 314 to the sink node SN MAC address in the header 303.

The header generating unit 102 sets the counter value to the initial value (S904). Next, the header generating unit 102 generates the adhoc data 304 by adding the generated header 303 to the encrypted message 302. The header generating unit 102 transmits the generated adhoc data 304 to the MAC generating unit 103.

The MAC generating unit 103 reads the MAC key 306 from the key information storage unit 106 and calculates the MAC 305 for the received adhoc data 304 (S905). The MAC generating unit 103 adds the generated MAC 305 to the adhoc data 304 to generate the packet 300. The MAC generating unit 103 transmits the generated packet 300 to the adhoc communicating unit 111.

The adhoc communicating unit 111 transmits the packet 300 received from the MAC generating unit 103 (i.e., the adhoc data with the MAC attached thereto) to the transfer destination MAC address 312 via the adhoc network 100 (S906). The transmission processing by the node N1 of the detected data is completed due to the above processing.

The following is an explanation of processing when a certain node (node N2 in this example) receives the packet 300.

(Packet Transfer Processing)

Figure 7:
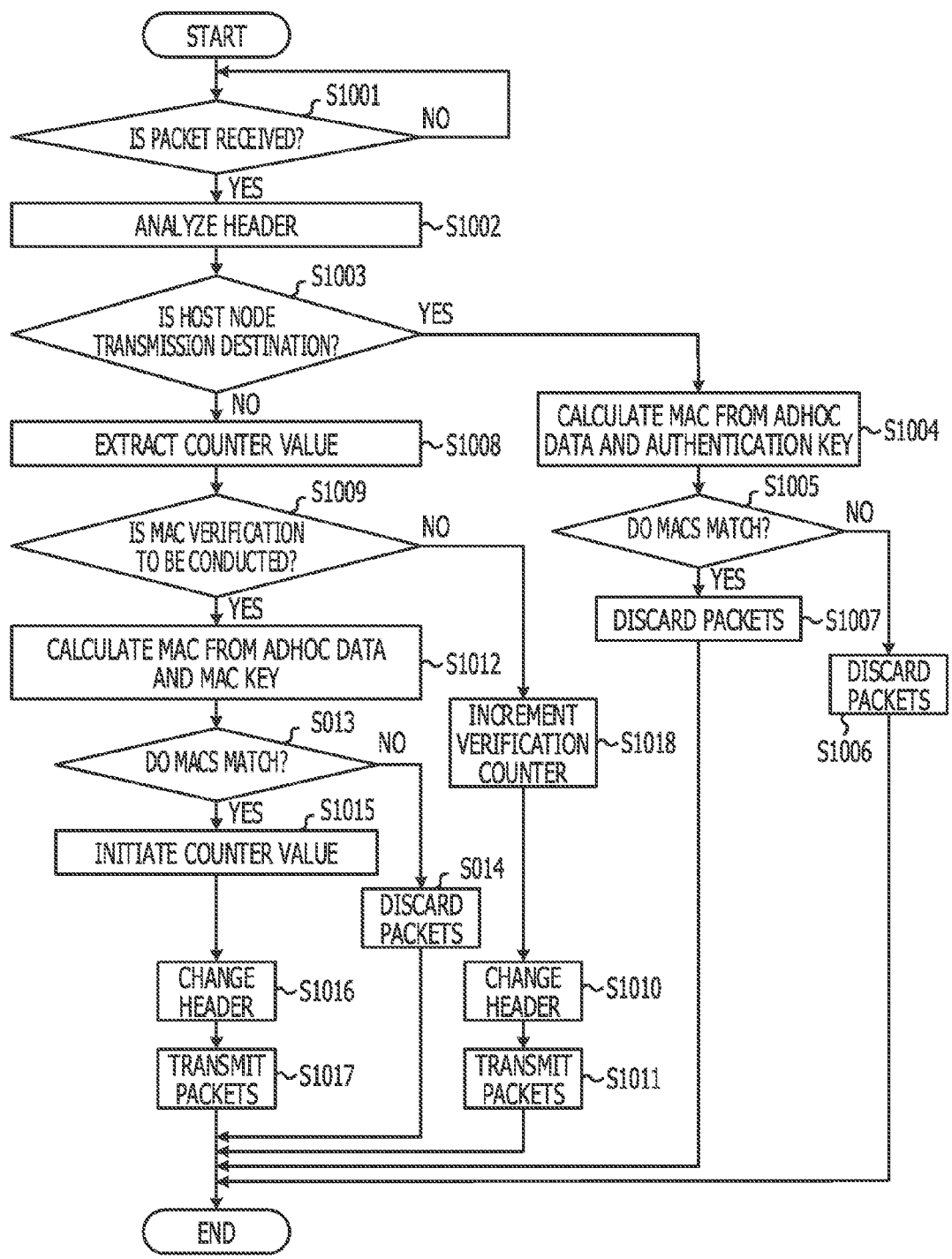
FIG. 7 is a flow chart of processing when a packet is received.

FIG. 7 is a flow chart of processing when a packet is received. In FIG. 7, the node N2 waits until the packet 300 is received by the adhoc communicating unit 111 (S1001: No). When the packet 300 is received (S1001: Yes), the packet 300 is transmitted to the transmission destination evaluating unit 107.

The transmission destination evaluating unit 107 extracts the adhoc data 304 and the MAC 305 from the received packet 300. The transmission destination evaluating unit 107 analyzes the header 303 included in the adhoc data 304 (S1002) and evaluates whether the host node N2 is the final transmission destination of the received packet 300 (S1003). If the transmission destination evaluating unit 107 evaluates that the host node N2 is the final transmission destination (S1003: Yes), the transmission destination evaluating unit 107 transmits the extracted adhoc data 304 and the MAC 305 to the MAC verifying unit 108 in order to assess whether the received packet 300 is a malicious packet or not.

The MAC verifying unit 108 reads the MAC key 306 from the key information storage unit 106 and calculates the MAC from the MAC key 306 and the received adhoc data 304 (S1004). The MAC verifying unit 108 assesses whether the MAC calculated in S1004 and the value of the MAC 305 included in the received packet 300 match (the evaluation processing of a match or a non-match is referred to below as MAC verification) (S1005).

If the MAC verification fails, that is if the MAC values do not match each other (S1005: No), the MAC verifying unit 108 discards the packet 300 (S1006). If the MAC verification is successful, that is if the MAC values match (S1005: Yes), the MAC verifying unit 108 transmits the adhoc data 304 to the decoding processing unit 109. The decoding processing unit 109 extracts the decoding key 309 from the key information storage unit 106 and decodes the encrypted message 302 to obtain the message 301 (S1007).

If the transmission destination evaluating unit 107 evaluates that the host node N2 is not the final transmission destination of the received packet 300 (S1003: No), the node N2 conducts transfer processing for transmitting the packet 300 to the destination node. The transmission destination evaluating unit 107 transmits the adhoc data 304 and the MAC 305 to the verification determining unit 105.

The verification determining unit 105 extracts the counter value 308 in the header included in the adhoc data 304 (S1008). The verification determining unit 105 evaluates whether or not to conduct the MAC verification in accordance with the extracted counter value 308 (S1009).

The verification determining unit 105 may assess whether to conduct the MAC verification based on the authentication implementation probability P instead of on the counter value 308 in S1009. Whether to conduct the MAC verification based on the counter value 308 or whether to conduct the MAC verification based on the authentication implementation probability P may be determined beforehand.

Moreover, the verification determining unit 105 may determine whether to conduct the MAC verification based on the counter value only for a packet for which a determination has been made to not conduct the MAC verification based on the authentication implementation probability P.

(Counter Value)

The following is an explanation of processing by the node N2 to evaluate whether to conduct the MAC verification using the counter value according to the present embodiment.

Figure 8:
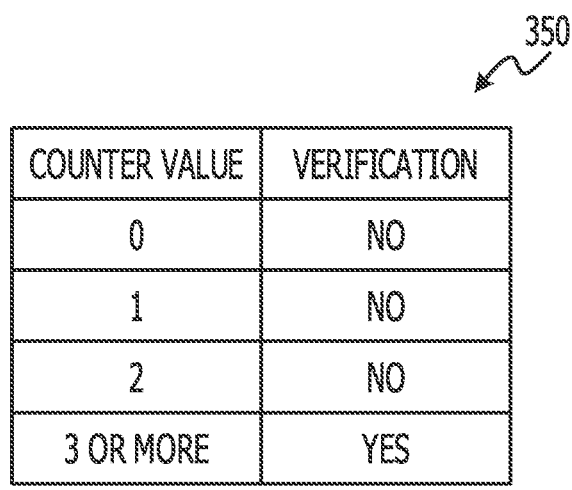
FIG. 8 is a reference table 350.

FIG. 8 is a reference table 350 in which counter values and criteria for determining whether to conduct the MAC verification are determined. The reference table illustrated in FIG. 8 is stored beforehand in each node. The reference tables stored beforehand in each node may all be the same throughout the system or may be different in each node in another system. The reference table 350 includes the counter values and information for evaluating whether to conduct the verification. The information for identifying whether to conduct verification corresponds to counter values and indicates whether or not to conduct the MAC verification. The node N2 conducts the MAC verification if the counter value is "3" or more in FIG. 8.

Figure 9:
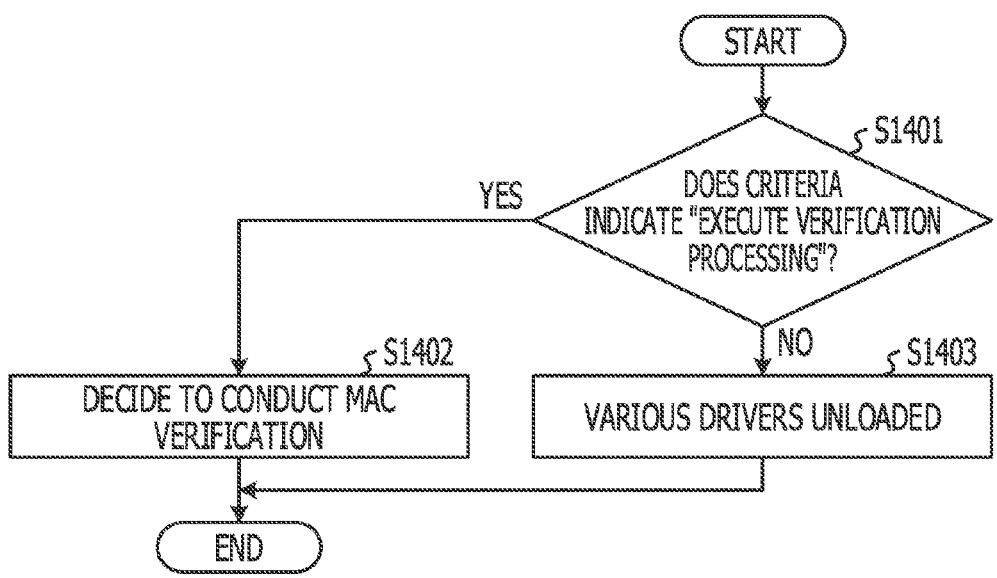
FIG. 9 is a flow chart of a evaluation process.

FIG. 9 is a flow chart of evaluation processing. The verification determining unit 105 determines whether to conduct the MAC verification based on the counter value 308 extracted in S1008 and on the reference table 350 (S1401). Specifically, the criteria as to whether to conduct the MAC verification associated with the counter value in the reference table 350 that corresponds to the counter value 308 extracted in S1008, specifies whether to conduct the verification processing. If the criteria indicates that the verification processing is to be conducted (S1401: Yes), the verification determining unit 105 decides to conduct the MAC verification (S1402). If the criteria indicates that the verification processing is not to be conducted (S1401: No), the verification determining unit 105 decides to not conduct the MAC verification (S1403).

If, for example, the counter value 308 is "1", the verification determining unit 105 determines to not conduct the MAC verification since the "information for identifying whether to conduct verification" indicates "No". If, for example, the counter value 308 is "4", the verification determining unit 105 determines to conduct the MAC verification since the criteria for the "information for identifying whether to conduct verification" that indicates "Yes" is "3 or more".

The values in the reference table 350 may be set as individual values in each node. Therefore, the MAC verification may be conducted on many packets in a node with a high processing capacity by reducing the value of the "information for identifying whether to conduct verification" in the reference table 350, and the frequency of conducting the MAC verification in a node with a low processing capacity may be lowered by increasing the value of the "information for identifying whether to conduct verification" in the reference table 350. As a result, loads for MAC verification may be distributed more effectively.

(MAC Verification)

If it is determined that the MAC verification is to be conducted in S1009 (S1009: Yes), the verification determining unit 105 transmits the adhoc data 304 and the MAC 305 to the MAC verifying unit 108.

The MAC verifying unit 108 reads the MAC key 306 from the key information storage unit 106. The MAC verifying unit 108 calculates the MAC from the adhoc data 304 extracted from the packet 300 and the read MAC key 306 (S1012). Specifically, the MAC verifying unit 108 derives a MAC value by using a keyed-hashing for message authentication code (HMAC) that uses hash functions such as SHA1 and SHA2 for example. The MAC value may also be derived by using an AES-CBC-MAC algorithm that uses common key authentication/common key encryption.

The MAC verifying unit 108 assesses whether the MAC calculated in S1012 matches the MAC 305 stored in the packet 300 (S1013). If the MAC values do not match, that is if the MAC verification fails (S1013: No), the MAC verifying unit 108 discards the packet 300 (S1014). If the MAC values match, that is if the MAC verification is successful (S1013: Yes), the MAC verifying unit 108 transmits the adhoc data 304 to the header generating unit 102.

The header generating unit 102 sets the counter value 308 of the header 303 to the initial value (S1015). The header generating unit 102 changes the header 303 to a new header 323 (S1016). Specifically, the header generating unit 102 specifies the "transfer source" in the routing table corresponding to the "transfer source MAC address 311" in the packet 300 and specifies the transfer destination node from the "transfer destination" field corresponding to the "transfer source" field specified in the routing table. The header generating unit 102 sets the transfer destination MAC address 312 to the specified node MAC address. The header generating unit 102 sets the transfer source MAC address 311 to the MAC address of the host node N2.

The header generating unit 102 further generates new adhoc data 324 by adding the new header 323 to the encrypted message 302. The header generating unit 102 transmits the newly generated adhoc data 324 to the MAC generating unit 103.

The MAC generating unit 103 reads the MAC key 306 from the key information storage unit 106 and uses the MAC key 306 to generate a new MAC 315 for the new adhoc data 324. The MAC generating unit 103 generates a new packet 310 by adding the generated MAC 315 to the adhoc data 324.

The MAC generating unit 103 transmits the newly generated packet 310 to the adhoc communicating unit 111.

The adhoc communicating unit 111 transmits the packet 310 to the transmission destination node through the adhoc network 100 (S1017).

The following is an explanation of processing when the MAC verification is not conducted. If it is determined that the MAC verification is not to be conducted (S1009: No), the verification determining unit 105 divides the adhoc data 304 into the header 303 and the encrypted message 302. The verification determining unit 105 transmits the encrypted message 302 to the header generating unit 102.

The verification determining unit 105 increments the value of the counter value 308 in the header 303 in order to transfer the packet without conducting the verification in the host node (S1018). The header generating unit 102 changes the header 303 of the packet 303 to the new header 323 (S1010).

The header generating unit 102 generates the new adhoc data 324 by adding the new header 323 to the encrypted message 302. The header generating unit 102 transmits the generated adhoc data 324 to the MAC generating unit 103.

The MAC generating unit 103 reads the MAC key 306 from the key information storage unit 106. The MAC generating unit 103 uses the MAC key 306 to generate the new MAC 315 for the new adhoc data 324.

The range of the data to be subject to the MAC calculation may be changed as appropriate. For example, the MAC may not be changed if the system is configured so that the MAC is calculated for a range that includes the transmission source, the transmission destination, and the encrypted message and the packet is only transferred. Thus, in a system in which the MAC is calculated for a range that includes the transmission source, the transmission destination, and the encrypted message, the nodes may only change the transfer source MAC address, the transfer destination MAC address, and the counter value if the packet is transferred without conducting the MAC verification. As a result, since transfer is possible without recalculating the MAC, the processing load of the nodes that conduct transfers is reduced.

The MAC generating unit 103 generates a new packet 310 that includes the new MAC 315 and the new adhoc data 324 by adding the generated MAC 315 to the adhoc data 324. The MAC generating unit 103 transmits the newly generated packet 310 to the adhoc communicating unit 111.

Figure 10:
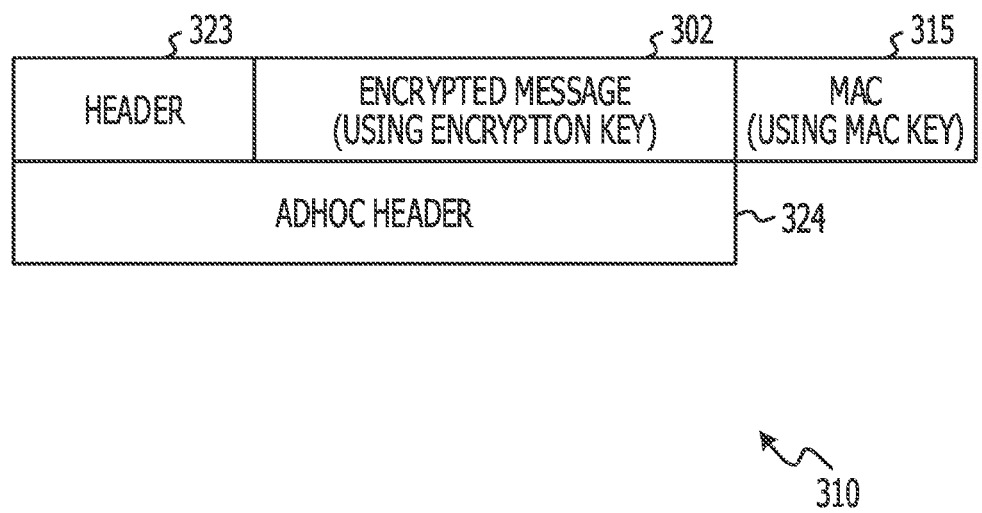
FIG. 10 is an example of a configuration of a new packet 310.

FIG. 10 is a configuration example of the new packet 310. The new packet 310 includes the new adhoc data 324 and the new MAC 315. The new adhoc data 324 includes the new header 323 and the transferred encrypted message 302.

The adhoc communicating unit 111 transmits the packet 310 after rewriting the new header 323 in S1010 to the transmission destination node through the adhoc network 100 (S1011). As a result, the transfer processing of the packet that is decided as subject to transferring in S1003 is completed.

(Example of Using Verification Probability)

Figure 11:
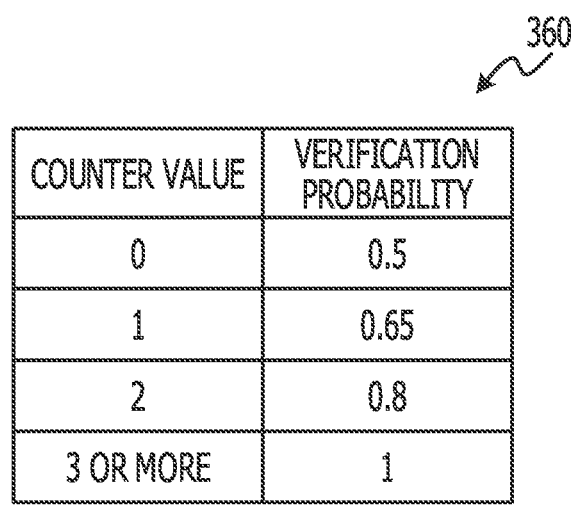
FIG. 11 is a probability table 360.

FIG. 11 illustrates a probability table 360 in which counter values are associated with probabilities to conduct the MAC verification. The probability table 360 includes counter values and verification probabilities. A verification probability is information for identifying the probability of whether or not to conduct the MAC verification. The determination processing S1009 in FIG. 7 changes if the verification probability is used. The following is an explanation of evaluation processing by the node N2 to evaluate whether to conduct the MAC verification using the verification probability. The probability table 360 illustrated in FIG. 11 is stored beforehand in each node. Probability tables stored beforehand in each node may all be the same throughout the system or may be different in each node in another system.

Figure 12:
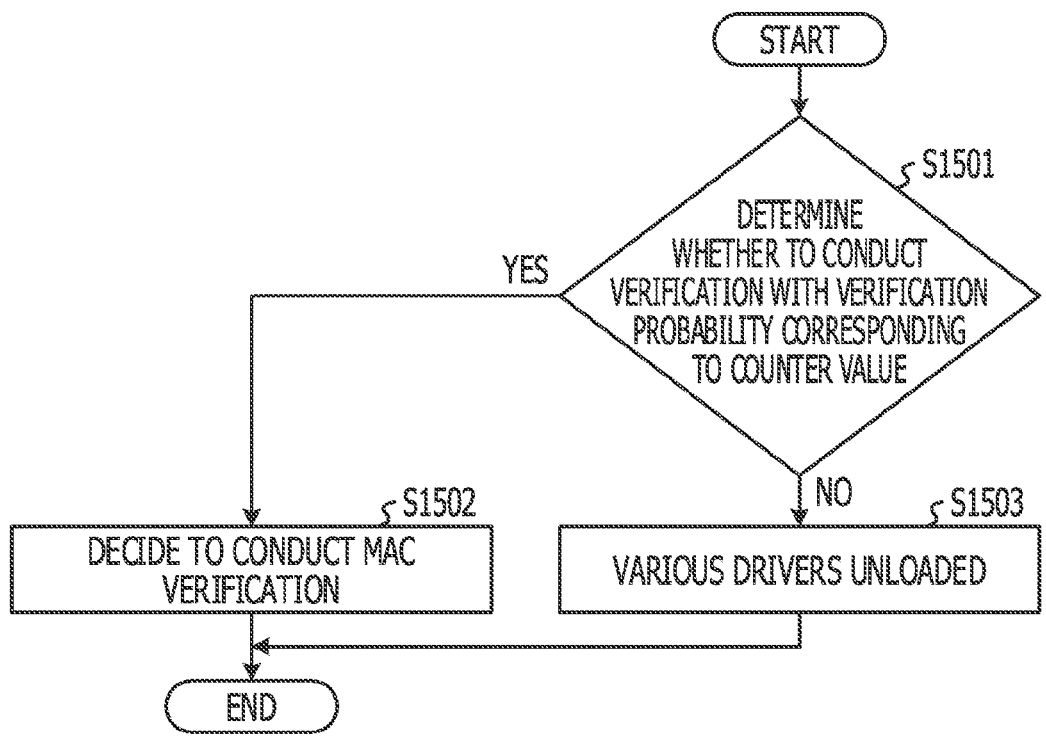
FIG. 12 is a flow chart of evaluation processing when verification probability is used.

FIG. 12 is a flow chart of evaluation processing when verification probability is used. The verification determining unit 105 determines whether to conduct the MAC verification based on the counter value 308 extracted in S1008 and on the probability table 360 (S1501). If the counter value of the received packet 300 is "0" in the probability table 360 in FIG. 11, the verification determining unit 105 determines that the MAC verification is to be conducted at a verification probability of 0.5. Similarly, the verification determining unit 105 determines that the MAC verification is to be conducted according to a verification probability of 0.65 if the counter value is "1", a verification probability of 0.8 if the counter value is "2", and a verification probability of 1 if the counter value is "3 or more". The verification probability is set so as to increase as the counter value 308 increases. As a result, a packet that is repeatedly multi-hopped without MAC verification is subject to the MAC verification at a higher probability.

If the MAC verification is to be conducted (S1501: Yes), the verification determining unit 105 decides to conduct the MAC verification (S1502). If the MAC verification is not to be conducted (S1501: No), the verification determining unit 105 decides to not conduct the MAC verification (S1503).

As described above, a node decides whether to conduct a verification using the MAC verifying unit 108 or whether to transfer the packet 300 as-is to the transfer destination without conducting verification, according to a verification probability set beforehand based on the counter value 308 included in the header 303 of the packet 300. Since each node in the adhoc network 100 conducts this processing upon receiving a packet, load distribution is made possible by avoiding a concentration of the load in the sink node SN or in a node that directly receives malicious packets. As a result, a loss of packets or a delay in adhoc communication is reduced.

The verification probability in the probability table 360 may be set as individual verification probabilities for each node. Therefore, the MAC verification may be conducted on many packets in a node with a high processing capacity by increasing the value of the "verification probability" in the reference table 350, and the frequency of conducting the MAC verification in a node with a low processing capacity may be lowered by increasing the value of the "verification probability" in the reference table 350. As a result, loads for MAC verification may be distributed more effectively.

(Hardware Configuration)

Figure 15:
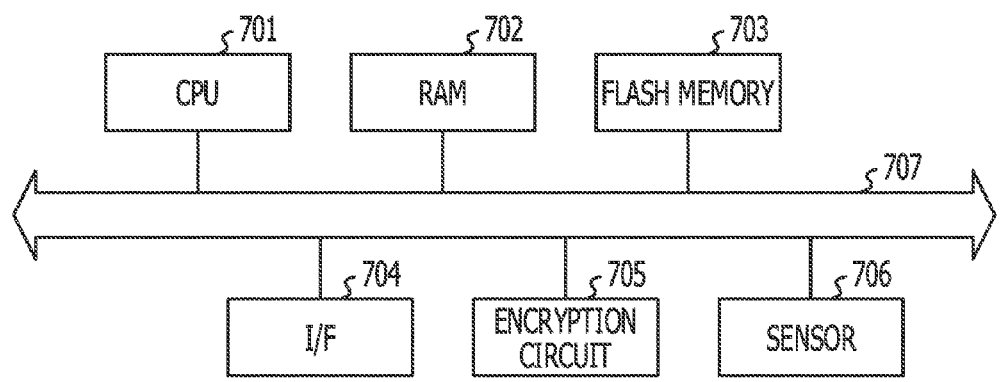
FIG. 15 is an example of a hardware configuration of a node.

FIG. 15 is an example of a hardware configuration of a node that configures the adhoc network 100. In FIG. 15, a node is provided with a central processing unit (CPU) 701, a random access memory (RAM) 702, a flash memory 703, an interface (I/F) 104, an encryption circuit 705, the sensor 706, and a bus 707. The CPU 701 to the sensor 706 is all interconnected by the bus 707.

The CPU 701 controls the entire node. The CPU 701 functions as the adhoc communicating unit 111, the header generating unit 102, the MAC generating unit 103, the encryption processing unit 104, the verification determining unit 105, the key information storage unit 106, the transmission destination evaluating unit 107, the MAC verifying unit 108, and the decoding processing unit 109 by conducting programs expanded in the RAM 702.

The RAM 702 is used as a work area by the CPU 701. The flash memory 703 stores programs, the reference table, the probability table, the routing table, and key information such as the MAC key and the encryption key. The I/F 704 transmits and receives packets through multihop communication.

The encryption circuit 705 is a circuit for encrypting data by using the encryption key when data is to be encrypted. If the encryption is conducted with software, a program corresponding to the encryption circuit 705 is stored in the flash memory and the encryption circuit 705 becomes unnecessary. The sensor 706 detects data inherent to the sensor 706. For example, the sensor 706 may detect data to be measured such as temperature, humidity, water levels, rainfall amounts, wind strength, sound levels, electrical power utilization amounts, gas utilization amounts, time periods, or data and time and the like.

According to the above explanation, the node of the present embodiment transfers, without MAC verification, packets with a low priority for MAC verification in order to reduce operations in a node with a high load. A packet with a low priority for MAC verification is deemed to have been subject to MAC verification at a node that the packet passed through previously. Accordingly, by including the counter value in the packet, the host node is able to detect whether a MAC verification has been conducted previously. According to this configuration, the nodes that conduct MAC verification may be distributed.

(Second Embodiment)

(Processing to Evaluate the Load of a Node)

The following is an explanation of processing to assess whether a MAC verification has been conducted in accordance with the processing load of a node. The processing involves deciding whether a node (a node N3 in this example) has conducted a MAC verification based on the size of the processing load of the host node N3. Configurations that are similar to the first embodiment are omitted.

Packets may be concentrated at a specific node in an adhoc network.

In this case, since the node in which the packets are concentrated has a high load for processing the transfer of packets and MAC verification, it is desirable to reduce the processing load. A node may be present on the same route that would not have a processing delay even if that node conducted MAC verification.

Accordingly, each node is provided with a function for detecting the load of the host node, and if the load of the host node is low, the MAC verification is conducted regardless of the counter value. If the load of the host node is high, a determination is made as to whether the MAC verification is to be conducted based on the counter value.

According to this configuration, the number of packets for which MAC verification is to be conducted is reduced in a node with no margin in the load since the counter value is initialized in order to proactively allow a node with a margin in the load thereof to conduct the MAC verification.

Figure 13:
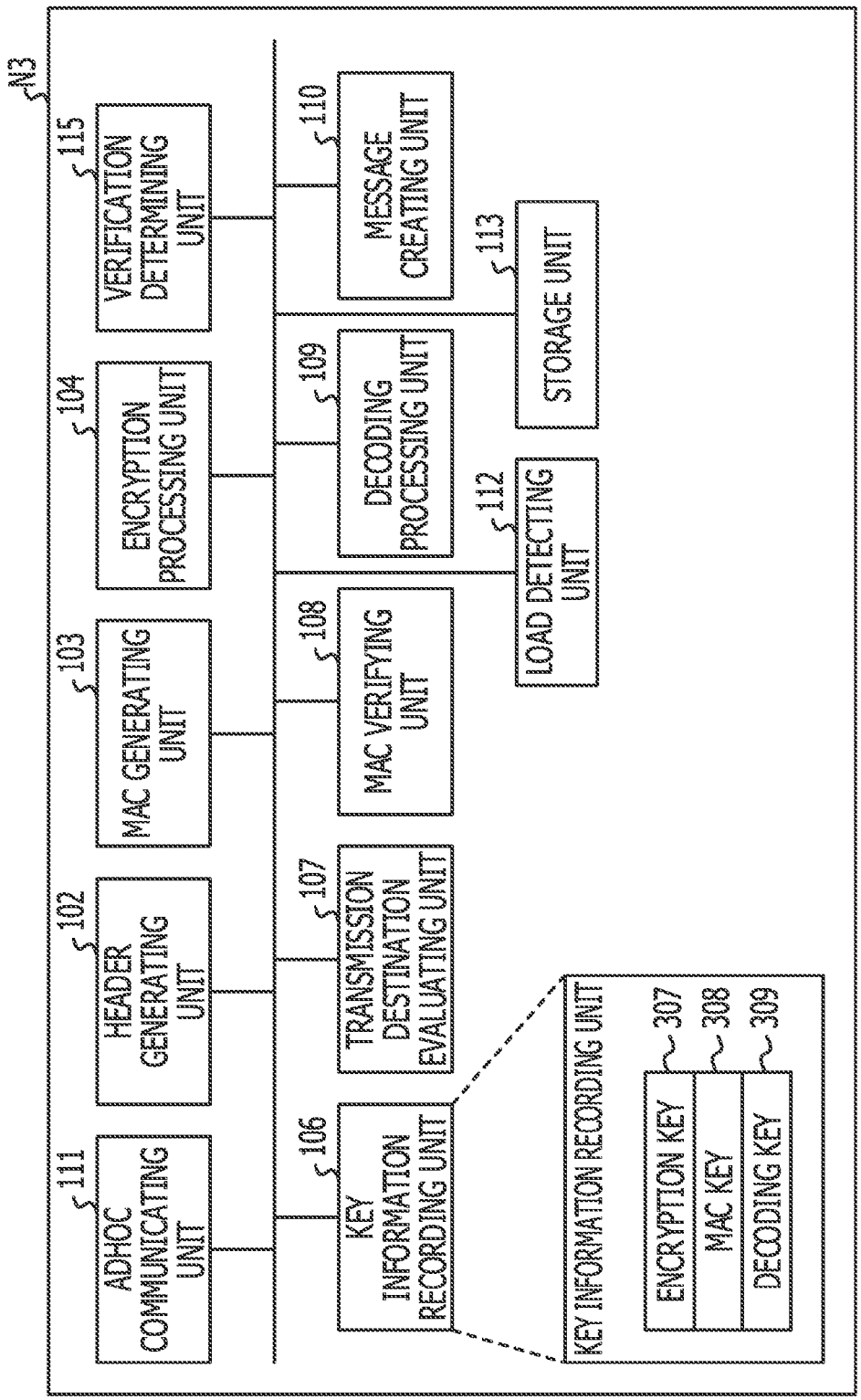
FIG. 13 is a functional block diagram of a node N3.

FIG. 13 is a functional block diagram of a node according to an embodiment that involves the detection of the load of the host node.

Explanations of the adhoc communicating unit 111, the header generating unit 102, the MAC generating unit 103, the encryption processing unit 104, the key information storage unit 106, the transmission destination evaluating unit 107, the MAC verifying unit 108, and the decoding processing unit 109 illustrated in FIG. 13 are omitted since the explanations are provided above with regard to FIG. 5.

A load detecting unit 112 detects the size of a current load of the host node N3.

A verification determining unit 115 evaluates whether to conduct MAC verification based on the counter value included in the packet and on the size of load of the host node as detected by the load detecting unit 112.

All the nodes in the adhoc network 100 in the present embodiment derive, by measuring or calculating, a load amount desired to conduct MAC verification in the host node and a load amount A in which the processing capacity of the host node is not reduced, and store the load amounts in the storage unit 113.

Figure 14:
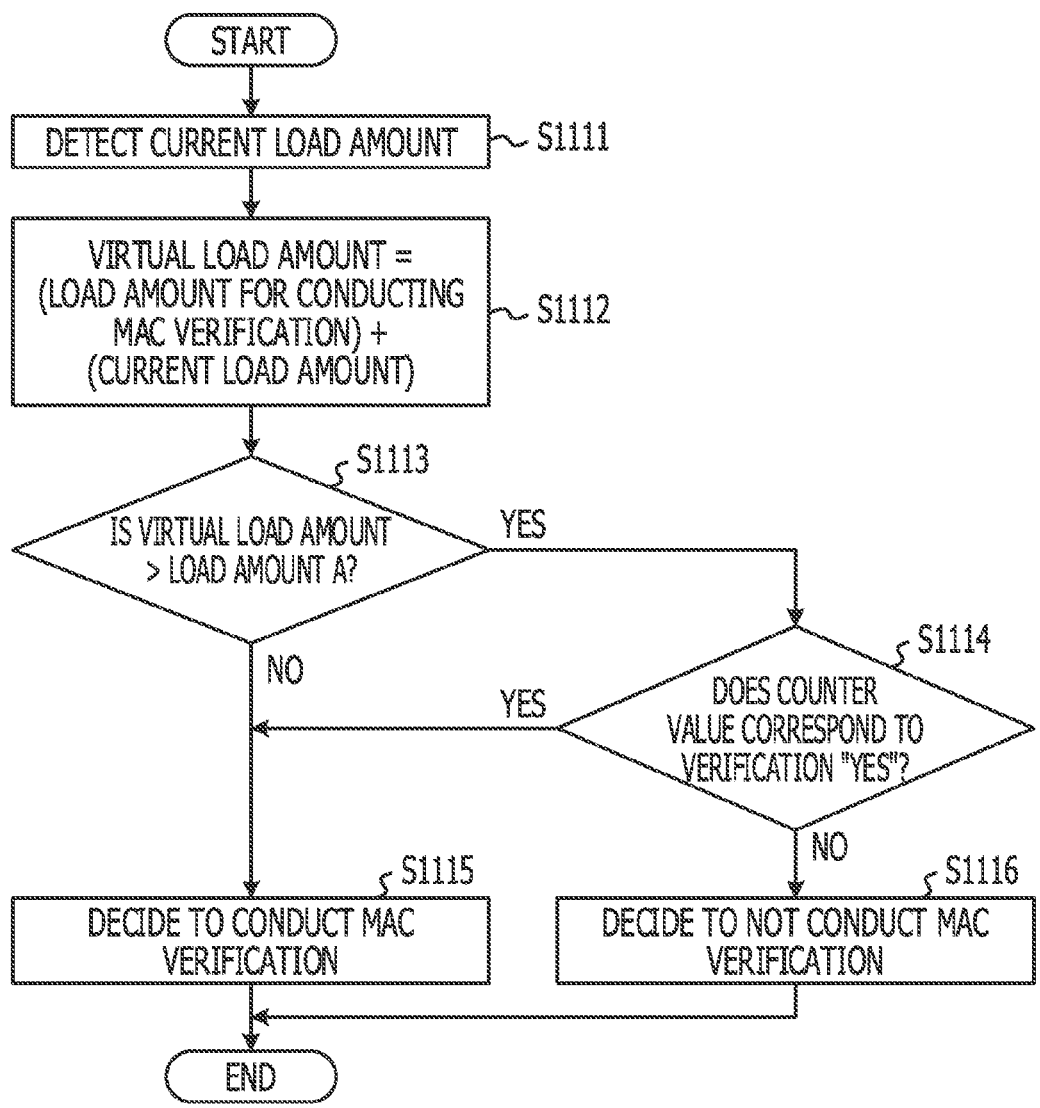
FIG. 14 is a flow chart of processing for determining whether a MAC verification is to be conducted.

FIG. 14 is a flow chart of processing by the node N3 for assessing whether to conduct a MAC verification. The flow chart corresponds to the processing in S1009 in FIG. 7.

The load detecting unit 112 detects the current load amount (S1111).

The verification determining unit 115 reads, from the storage unit 113, the load amount for conducting a MAC verification stored in the storage unit 113, and calculates a virtual load amount by adding the current load amount detected in S111 (S1112).

The verification determining unit 115 evaluates whether the virtual load amount calculated in S1112 exceeds the load amount A stored in the storage unit 113 (S1113).

If the virtual load amount exceeds the load amount A (S1113: Yes), the verification determining unit 115 refers to the counter value 308 to determine whether to conduct the MAC verification (S1114). If the MAC verification is to be conducted (S1114: Yes), the verification determining unit 115 decides to conduct the MAC verification (S1115). If the MAC verification is not to be conducted (S1114: No), the verification determining unit 115 decides not to conduct the MAC verification (S1116).

If the virtual load amount does not exceed the load amount A (S1113: No), the verification determining unit 115 decides to conduct the MAC verification (S1115).

According to the above configuration, freedom to determine whether to conduct the MAC verification is improved in an upstream node since the MAC verification is proactively conducted in a node with no load. By allowing distribution of the loads among the upstream nodes, the processing efficiency of the entire adhoc network is improved.

The verification determining unit 115 may determine whether the load amount of the host node N3 exceeds a certain threshold (e.g., 80% of the load) without determining whether to conduct the MAC verification based on the virtual load amount in S1112 and S1113.

Moreover, each node may store beforehand a plurality of reference tables that vary in accordance with the load of the host node and use the reference tables in accordance with the load conditions of the node.

According to the above explanation, the nodes transfer packets to the next node without conducting the MAC verification if the load of the host node is high and the counter value is low. Conversely, the nodes conduct the MAC verification if the load of the host node is low or the counter value is high. According to this configuration, a node having a margin in the processing load thereof may be prioritized and the MAC verification may be conducted.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A node device comprising:
   a memory; and
   a processor coupled to the memory configured to:
   receive a first packet that is transferred from a source to a destination via at least one node device including the node device, the first packet including a counter value regarding a number of transfers of the first packet, and first coding information according to a first key information and contents of the first packet,
   determine whether to conduct a verifying process on the first packet based on the counter value, and
   when it is determined that the verifying process is to be conducted,
   verify the first coding information is the same as a second coding information, the second coding information being generated according to the contents of the first packet and a second key information stored in the memory,
   change the counter value in the first packet to an initial value when the first coding information is the same as the second coding information, and
   transmit the first packet including the changed counter value to the destination or any one of the at least one node device other than the node device.

2. The node device according to claim 1, wherein the processor determines that the verifying process is to be conducted when the counter value matches defining information stored in the memory, the defining information defining whether the verifying process is to be conducted for each of a plurality of counter values including the counter value.

3. The node device according to claim 1, wherein, when the processor determines that the verifying process is not to be conducted, the processor is further configured to increment the counter value and transmit the first packet including the incremented counter value to the destination or any one of the at least one node device other than the node device.

4. The node device according to claim 2, wherein the defining information indicates a probability for conducting the verifying process associated with each of the plurality of counter values.

5. The node device according to claim 1, wherein the processor is further configured to:
   determine that the verifying process is to be conducted when a load amount of the node device is equal to or less than a threshold, and
   when the load amount is higher than the threshold, determine whether the verifying process is to be conducted based on the counter value.

6. The node device according to claim 1, wherein the processor is further configured to search a path from the node device to the destination in an adhoc network, and wherein the first packet is transmitted using the path.

7. A control method executed by a node device, comprising:
- receiving a first packet that is transferred from a source to a destination via at least one node device including the node device, the first packet including a counter value regarding a number of transfers of the first packet, and first coding information according to a first key information and contents of the first packet;
- determining whether to conduct a verifying process on the first packet based on the counter value; and
- when it is determined by the determining that the verifying process is to be conducted,
  - verifying the first coding information is the same as a second coding information, the second coding information being generated according to the contents of the first packet and a second key information stored in a memory,
  - changing the counter value in the first packet to an initial value when the first coding information is the same as the second coding information, and
  - transmitting the first packet including the changed counter value to the destination or any one of the at least one node device other than the node device.

8. The control method according to claim 7, wherein the determining determines that the verifying process is to be conducted when the counter value matches defining information stored in the memory, the defining information defining whether the verifying process is to be conducted for each of a plurality of counter values including the counter value.

9. The control method according to claim 8, further comprising:
- when the determining determines that the verifying process is not to be conducted,
  - incrementing the counter value, and
  - transmitting the first packet including the incremented counter value to the destination or any one of the at least one node device other than the node device.

10. The control method according to claim 7, wherein the defining information indicates a probability for conducting the verifying process associated with each of the plurality of counter values.

11. The control method according to claim 7, wherein:
- the determining determines that the verifying process is to be conducted when a load amount of the node device is equal to or less than a threshold, and
- when the load amount is higher than the threshold, the determining determines whether to conduct the verifying process based on the counter value.

* * * * *